United States Patent [19]
Welch, Jr.

[11] Patent Number: 5,555,728
[45] Date of Patent: Sep. 17, 1996

[54] APPARATUS AND METHOD FOR PRODUCING POWER USING THE EXCESS PRESSURE IN NATURAL GAS PIPELINES

[75] Inventor: Kenneth W. Welch, Jr., Houston, Tex.

[73] Assignee: Welch, Welch and Swanson, Houston, Tex.

[21] Appl. No.: 383,420

[22] Filed: Feb. 3, 1995

[51] Int. Cl.⁶ ..................................................... F03B 17/00
[52] U.S. Cl. .............................................................. 60/496
[58] Field of Search .............................. 60/495, 496, 648

[56] References Cited

U.S. PATENT DOCUMENTS

| | | | |
|---|---|---|---|
| 272,656 | 2/1883 | Cook | 60/496 |
| 366,551 | 7/1887 | Baker | 60/496 |
| 4,326,132 | 4/1982 | Bokel | 60/496 |
| 4,387,575 | 6/1983 | Wenzel | 60/648 |
| 4,981,015 | 1/1991 | Simpson | 60/495 |

FOREIGN PATENT DOCUMENTS

| | | | |
|---|---|---|---|
| 4058 | of 1816 | United Kingdom | 60/496 |
| 163791 | 5/1921 | United Kingdom | 60/496 |

OTHER PUBLICATIONS

Stewart & Stevenson Technical Services, Inc., *Are You Wasting Engergy?*, Mar. 1994.

*Primary Examiner*—Leonard E. Heyman
*Attorney, Agent, or Firm*—Vaden, Eickenroht & Thompson, L.L.P.

[57] ABSTRACT

An apparatus and method are provided that comprise the use of a water-filled vessel having two vertical sections and two horizontal sections that connect the respective upper and lower ends of the vertical sections. A sprocket is mounted for rotation with a horizontal output shaft in one of the horizontal sections, and an idler pulley is mounted for rotation in the other horizontal section. An endless drive chain carrying a plurality of gas receptacles, or buckets encircles the sprocket and the idler pulley within the vessel. A gas inlet is positioned at the bottom of the vessel such that a portion of the gas entering the vessel enters the open ends of the downwardly facing buckets and forces part of the water out of the buckets. The hydrostatic pressure of the water exerts an upward buoyant force on the gas in the bucket moving the bucket upwardly. The hydrostatic pressure of the water decreases as the bucket moves upward causing a corresponding reduction in the pressure of the gas until, at the surface, the gas will have decreased in pressure by the hydrostatic pressure of the water at the inlet of the gas into the vessel. The upward movement of the buckets rotates the sprocket and the output shaft whereby power is produced for use outside of the vessel and the pressure of the gas is reduced.

6 Claims, 2 Drawing Sheets

APPARATUS AND METHOD FOR PRODUCING POWER USING THE EXCESS PRESSURE IN NATURAL GAS PIPELINES

BACKGROUND OF THE INVENTION

The present invention relates to the field of energy recovery, and more particularly, to the extraction of potential energy that exists in the form of excess pressure in natural gas pipelines.

Natural gas is typically transmitted in transmission pipelines at a pressure of 700 to 1000 psia. The gas pressure is reduced to 150 to 200 psia by pressure regulators and control valves at city gate stations for delivery to a distribution network where the pressure is again reduced to approximately 50 psia and supplied to consumers. However, the potential energy inherent in the excess gas pressure is lost in conventional pressure reduction devices, primarily in the form of waste heat.

One proposed solution to this problem of lost energy in natural gas pipelines is Stewart & Stevenson's recently developed energy recovery device referred to as the "Power Expander." When installed inline, high pressure gas passes through a nozzle in the Power Expander that directs the gas at an angle onto a reaction turbine wheel. The wheel is turned by the force of the gas, transmitting mechanical energy through an output shaft that is coupled to an induction generator.

When installed in a natural gas transmission line having an incoming pressure of 150 psia with a continuous flow of 21 million cubic feet per day and an outgoing pressure of 50 psia, the Power Expander produced an output of 382 hp that generated 250 kW at a 100 psi pressure reduction. Thus, this device produces approximately 3.82 hp that generates 2.5 kW per psi of gas pressure reduction, respectively.

It is an object of this invention to provide a method and apparatus for converting gas pressure to electricity by flowing gas under pressure sequentially into one of a plurality of downwardly opening receptacles in a liquid-filled vessel at a level where the hydrostatic pressure of the liquid equals the desired pressure reduction in the gas, to displace a portion of the liquid in the receptacle and create a buoyant force urging the receptacle upwardly and converting the buoyant force of the upwardly moving receptacles into rotary power.

It is a further object of this invention to provide an apparatus for converting gas pressure to useable power by using gas to displace liquid in downwardly facing buckets or receptacles carried by an endless drive chain and use the hydrostatic force of the liquid acting on the gas in the buckets to move the buckets upwardly to rotate the shaft of an electric generator.

It is a further object of this invention to provide an apparatus for producing power while reducing the pressure of gas in a pipeline, comprising a liquid-filled vessel having two vertical sections and two horizontal sections connecting the respective upper and lower ends of the vertical sections, a sprocket mounted for rotation with a horizontal output shaft in one of the horizontal sections, an idler pulley mounted for rotation in the other horizontal section, an endless drive chain encircling the sprocket and idler pulley, a plurality of open-ended receptacles carried by the drive chain, each receptacle being positioned on the chain for the open end of the receptacle to be facing downwardly as the receptacle moves upwardly with the drive chain and facing upwardly as the receptacles move downwardly with the chain, and a gas inlet at the bottom of the vessel positioned for at least a portion of the gas entering the vessel to enter the downwardly facing open ends of the buckets and displace liquid from the buckets and create a buoyant force urging the receptacles upwardly imparting rotation to the sprocket and the output shaft and reducing the pressure of the gas in the bucket, which gas is released to flow upwardly to the top of the vessel as the bucket is turned upside down as it travels over the sprocket, and an outlet for the gas at the top of the vessel.

It is still a further object of the present invention to provide a device for reducing the gas pressure in natural gas pipelines while significantly improving the amount of energy that may be recovered per psi of gas pressure reduction. Specifically, it is intended that the present invention will provide approximately 31.42 hp that will generate 22.14 kW per psi of gas pressure reduction, when operating to reduce an incoming pressure of 150 psia to an outgoing pressure of 50 psia.

These and other objects, advantages, and features of this invention will be apparent to those skilled in the art from a consideration of this specification including the attached drawings and appended claims.

DETAILED DESCRIPTION OF THE PREFERRED EMBODIMENT

Figure 3:
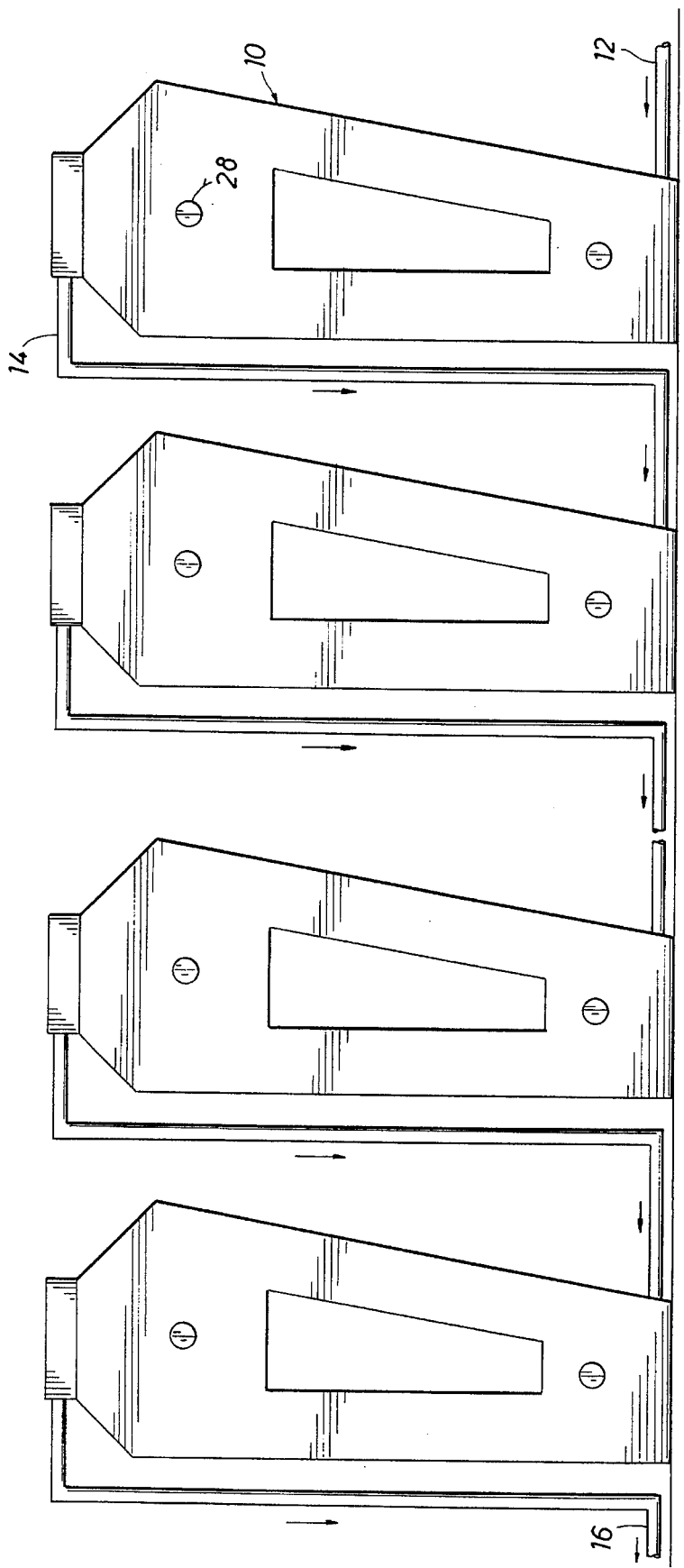
FIG. 3 is a flow diagram of a plurality of power producing apparatuses of this invention connected in series to convert a portion of the pressure in a natural gas pipeline to electrical energy.

FIG. 3 illustrates a flow diagram of several power producing apparatuses 10 according to the present invention that are connected in series between natural gas inlet pipeline 12 and outlet pipeline 16. Natural gas flows through pipeline 12 at pressures lying in the range of 150–200 psia. The pressure of the gas delivered to each successive power producing apparatus 10 will be reduced by approximately 6.2 psi as the gas is bubbled through 14.3 feet of water. While doing so, some of the energy represented by the 6.2 psi drop in pressure is converted to work that rotates output shaft 28 in a manner described below. The resulting torque on each output shaft 28 is then converted to electricity through an induction generator (not shown) or other means. By positioning a plurality of power producing apparatuses 10 in series, the pressure of the gas in exhaust line 14 will eventually be reduced to a level fit for consumer use. For example, the placement of 16 such apparatuses 10 in series will reduce a pressure of 150 psia in gas inlet pipeline 12 to approximately 50 psia in gas outlet pipeline 16 while cumulatively producing 3,142 hp that generates 2,214 kW of recoverable energy based on a generator efficiency of about 53–55%.

Figure 1:
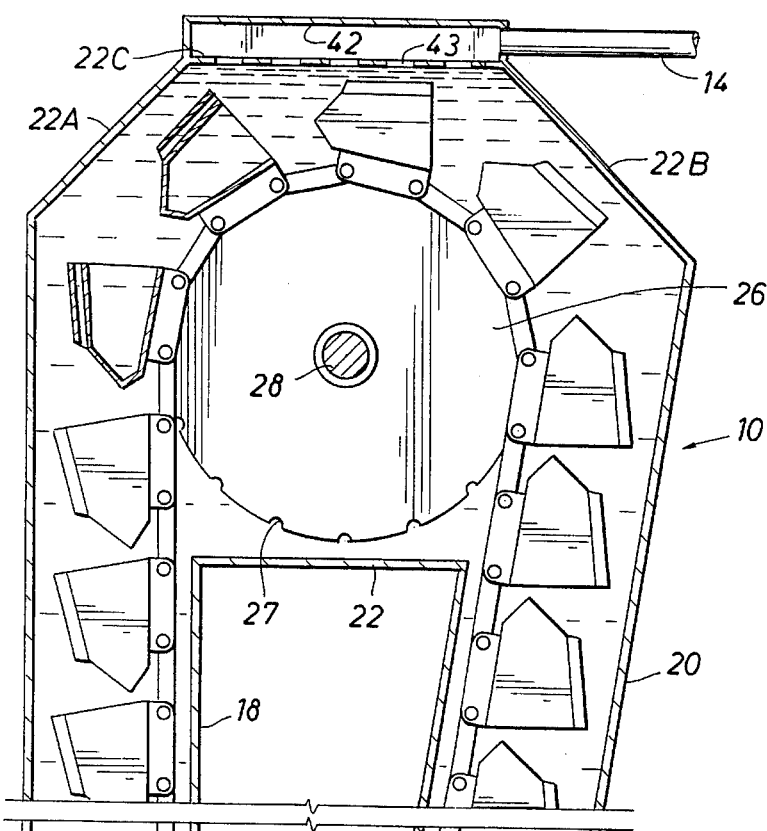
FIG. 1 is a front view partly in elevation and partly in section of a power producing apparatus according to the present invention.
Figure 2:
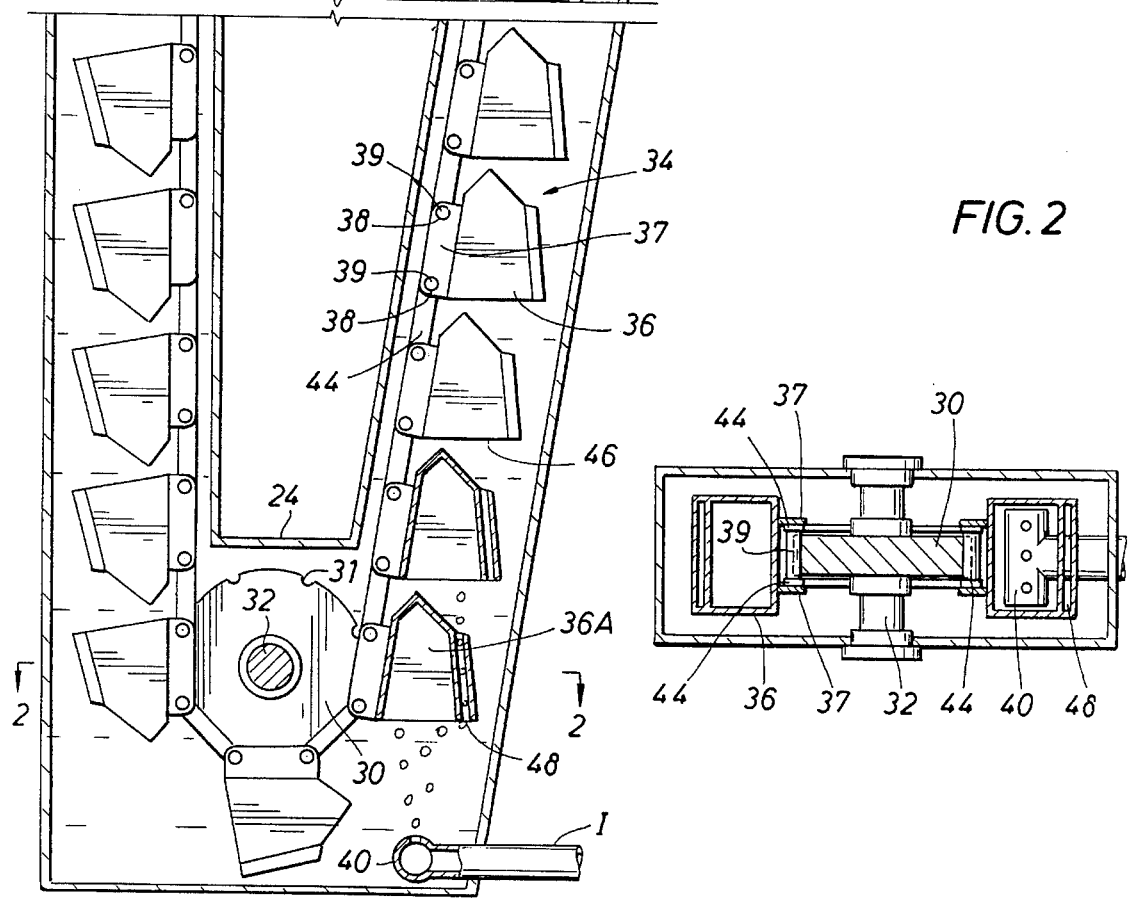
FIG. 2 is a sectional view of the lower horizontal section of the power producing apparatus taken along section line 2—2 of FIG. 1.

The preferred embodiment of the apparatus for performing the method of this invention is shown in FIG. 1 and indicated generally by the number 10. Apparatus 10 comprises a water-filled vessel having two generally vertical sections 18 and 20, and two horizontal sections 22 and 24 that connect the respective upper and lower ends of the vertical sections. In the embodiment shown, section 20 is angled slightly with respect to a vertical axis. Upper horizontal section 22 includes angled upper surfaces 22A and 22B as well as perforated horizontal upper surface 22C.

Sprocket 26 is mounted on and for rotation with horizontal output shaft 28 in upper horizontal section 22. Idler pulley 30 is mounted on and for rotation with pulley shaft 32 in lower horizontal section 24. Sprocket 26 is provided with external grooves 27 thereabout, and idler pulley 30 is provided with external grooves 31 thereabout for purposes that will be explained below.

Endless drive chain 34 extends around sprocket 26 and idler pulley 30. Gas receptacles or buckets 36 are attached to the drive chain. Gas receptacles 36 are preferably made of a material that is as close to neutral buoyancy as possible, such as acrylic. In the embodiment shown, each bucket 36 has a pair of flanges 37 that are pivotally connected to links 44 of the drive chain by pins 39 so the flanges act as another link in the drive chain. Grooves 31 of idler pulley 30 and grooves 27 of sprocket 26 are spaced to engage pins 39 as the drive chain moves over the pulley and the sprocket forcing the pulley and sprocket to rotate with the moving drive chain.

In operation, vessel 10 is filled with water to a level above the path of buckets 36 as they pass around sprocket 26. Gas under pressure enters the vessel through inlet line I. Perforated tube 40 is connected perpendicularly to inlet line I to distribute natural gas across the width of open end 46 of the buckets.

The gas first enters lower most bucket 36A and displaces the water in the bucket. Initially, only the hydrostatic pressure of the water acts against the gas in the bucket urging it upwardly. This may not be enough force to move the drive chain so passage 48 is provided to direct the excess gas to flow into the next bucket. This process continues until each of the downwardly opening buckets are filled with natural gas and the total buoyant force acting on the buckets urges drive chain 34 attached to the buckets upwardly in section 20 of the vessel. Once the drive chain and buckets are set in motion there will be sufficient buoyant force to convert a large percentage of the motion to work. The rotation of chain 34 produces a rotation of sprocket 26 and idler arm 30 by the engagement of pins 39 with respective grooves 27 and 31. Shafts 28 and 32 are in turn respectively rotated by sprocket 26 and idler arm 30.

The torque resulting from the rotation of output shaft 28, which extends outside of upper section 22 of the vessel, is used to drive an electric generator for electrical power production outside of the vessel. In the process, the pressure of the natural gas in the transmission lines is reduced to an appropriate level for consumer use.

The portion of the gas entering the vessel but not collected by the buckets, approximately 25 percent, rises abruptly in the water creating a current that flows counter-clockwise about the vessel sequentially through sections 20, 22, 18, and 24. This forced current enhances the movement of chain 34 of buckets 36 about the vessel.

As explained above, generally the desired pressure drop from the transmission line to the distribution lines is about 100 psi. To obtain a 100 psi drop using the vessel of this invention would require a vessel containing 230 feet of water. Alternatively, several vessels connected in series could be used, for example 16 vessels each containing enough water that the gas travels through about 14.3 ft. of water would drop the pressure to about 100 psi from a line pressure of 150 psi and as explained above produce about 2,214 Kw of power. In that case the pressure drops through each vessel will be about 6.2 psi.

From the foregoing, it will be seen that this invention is well adapted to attain all ends and objects set forth herein, together with other advantages that are obvious and inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter set forth herein or shown in the accompanying figures is to be interpreted as being illustrative and not in a limiting sense.

For example, while this invention is illustrated in the preferred embodiment as a plurality of power producing apparatuses 10, it will be appreciated that such apparatuses may be utilized in parallel or singularly in accordance with particular system requirements.

Furthermore, it will be appreciated by those skilled in the art that this invention may be utilized wherever excess gas pressure is present in a system, such as propane and methane storage tanks, and refinery burn-off gases.

What is claimed is:

1. An apparatus for producing power while reducing the pressure of gas in a pipeline, comprising:

a liquid-filled vessel having a first generally vertical section and a second section that is upwardly inclined away from the first section and two generally horizontal sections connecting the upper and lower ends of the first and second sections;

a sprocket mounted for rotation with a horizontal output shaft in one of the horizontal sections;

an idler pulley mounted for rotation in the other horizontal section;

an endless drive chain encircling the sprocket and idler pulley;

a plurality of open-ended receptacles formed of a material having substantially neutral buoyancy in the liquid and carried by the drive chain, each receptacle being positioned on the chain for the open end of the receptacle to be facing downwardly as the receptacle moves upwardly with the drive chain through the second section and facing upwardly as the receptacles move downwardly with the chain through the first section;

a gas inlet at the bottom of the vessel positioned for at least a portion of the gas entering the vessel to enter the downwardly facing open ends of the receptacles in the second section and displace liquid from the receptacles, thereby creating a positive buoyant force urging the receptacles upwardly and imparting rotation to the sprocket and the output shaft and reducing the pressure of the gas in the receptacles, which gas is released to flow upwardly to the top of the vessel as the receptacles are turned upside down as they travel over the sprocket; and an outlet for the gas at the top of the vessel.

2. The apparatus of claim 1 wherein said sprocket is larger in diameter than said idler pulley and is mounted for rotation in the horizontal section connecting the upper ends of the first and second sections and said idler pulley is mounted for rotation in the horizontal section connecting the lower ends of the first and second sections.

3. The apparatus of claim 1 in which each receptacle is provided with an overflow passageway on an exterior side of the receptacle through which gas entering the vessel may pass and enter the next higher receptacle until a sufficient buoyant force is created to start the upward movement of the receptacles and the rotation of the sprocket.

4. A method of producing power while reducing the pressure of gas in a pipeline, comprising the steps of:

flowing gas under pressure sequentially into a plurality of downwardly opening receptacles formed of a material that is substantially neutrally buoyant in a liquid and connected in an endless loop for rotation about upper and lower shafts in a vessel filled with the liquid, the gas being injected at a level where the hydrostatic pressure of the liquid in the vessel approximately equals the desired pressure reduction in the gas, to displace a portion of the liquid in the receptacles and create a positive buoyant force urging the receptacles upwardly to convert the buoyant force of the gas in the upwardly moving receptacles into rotary power at one of the shafts and reduce the pressure of the gas by an amount approximately equal to the hydrostatic head of water above the injection point of the gas.

5. A method of producing power while reducing the pressure of natural gas in a transmission line to pressure suitable for distribution, comprising the steps of:

injecting the natural gas into a liquid-filled vessel for collection by the downwardly facing open ends of a plurality of receptacles formed of a material having substantially neutral buoyancy in the liquid, the receptacles being carried by an endless drive chain encircling a sprocket mounted for rotation with a horizontal output shaft in the vessel and an idler pulley mounted for rotation in the vessel in such manner that the open end of the receptacles face downwardly as the receptacles move upwardly with the drive chain and face upwardly as the receptacles move downwardly with the chain, the collected natural gas displacing the liquid from the receptacles to create a positive buoyant force urging the downwardly-facing receptacles upwardly and imparting rotation to the sprocket and the output shaft while reducing the pressure of the natural gas in the receptacle, which natural gas is released to flow upwardly to the top of the vessel as each receptacle is turned upside down as it travels over the sprocket;

collecting the released natural gas via an outlet at the top of the vessel and sequentially delivering the collected natural gas to and releasing it from other such liquid-filled vessels connected in series for further pressure reduction until the pressure of the natural gas released from one of the other vessels approximates the desired distribution pressure; and converting the buoyant force of the upwardly moving receptacles in each of the vessels into rotary power at the respective output shafts.

6. A method of reducing the pressure of gas in a transmission line to the pressure of a gas distribution system while using the pressure reduction to generate electricity, comprising the steps of:

flowing the gas sequentially through a plurality of water-filled vessels with the gas being introduced adjacent the bottom of each vessel to move one side of an endless chain of buckets in each of the vessels upwardly with the upwardly moving gas to produce electric power as the pressure of the gas drops an amount substantially equal to the hydrostatic pressure of the water in each vessel until the pressure of the gas is reduced to that of the distribution system.

\* \* \* \* \*